United States Patent [19]
Rozenberg

[11] Patent Number: 6,082,991
[45] Date of Patent: Jul. 4, 2000

[54] INJECTION BLOW MOLDING MACHINE

[76] Inventor: Oleg Rozenberg, 2357 E. $19^{th}$ St., $2^{nd}$ Floor, Brooklyn, N.Y. 11229

[21] Appl. No.: 09/105,756

[22] Filed: Jun. 26, 1998

[51] Int. Cl.[7] .................................................. B29C 49/06
[52] U.S. Cl. .......................... 425/526; 264/537; 425/533; 425/534; 425/541
[58] Field of Search .................................. 425/526, 533, 425/534, 541, 522; 264/537

[56] References Cited

U.S. PATENT DOCUMENTS

| | | | |
|---|---|---|---|
| 2,331,688 | 10/1943 | Hobson | 264/536 |
| 3,733,162 | 5/1973 | Farkas | 425/533 |
| 3,784,348 | 1/1974 | Aoki | 425/534 |
| 3,807,923 | 4/1974 | Cannon et al. | 425/533 |
| 4,065,246 | 12/1977 | Marcus | 425/533 |
| 4,364,721 | 12/1982 | Rainville | 425/533 |
| 4,376,090 | 3/1983 | Marcus | 264/530 |
| 4,457,688 | 7/1984 | Calvert et al. | 425/533 |
| 4,512,735 | 4/1985 | Nilsson et al. | 425/533 |
| 5,874,115 | 2/1999 | Dobler | 425/533 |

FOREIGN PATENT DOCUMENTS

6-270235  9/1994  Japan ...................................... 425/522

*Primary Examiner*—Robert Davis
*Attorney, Agent, or Firm*—Richard M. Goldberg

[57] ABSTRACT

An injection blow molding machine utilizing an extruder and having interchangeable machine tooling components, for manufacturing injection blow molded articles of different configurations and sizes, includes a stationary machine platen; a movable machine platen which is movable toward and away from the stationary machine platen along a machine axis, to close and open a mold; opposite support rails mounted to the movable platen; a shuttle plate mounted on the movable machine platen between the opposite support rails for movement with the movable machine platen and movable perpendicular to the machine axis and having a rear surface in close proximity to the movable machine platen; core pin retainers mounted on the shuttle plate for movement therewith, each core pin retainer holding an interchangeable core pin that receives a parison to be blown into a bottle; slides movably mounted on the shuttle plate for movement with the shuttle plate and movable toward and away from each other in close proximity to a front surface of the shuttle plate around the core pin retainers mounted on the shuttle plate, the slides having interchangeable neck rings; an injection mold with interchangeable injection cavities mounted on the stationary platen; blow mold assemblies with interchangeable blow mold halves defining blow mold cavities, the blow mold assemblies fixed relative to and positioned adjacent to the stationary machine platen; take off stations mounted on the shuttle plate and including interchangeable pick off pins and stripper bushings.

30 Claims, 11 Drawing Sheets

INJECTION BLOW MOLDING MACHINE

BACKGROUND OF THE INVENTION

Injection blow-molding systems are well known in the art. A variety of different sophisticated injection blow-molding machines have been developed through the years.

Most known injection blow-molding machines use a vertical clamp and rotating tables, and require a complete mold change to produce bottles of different shapes and configurations. This leads to very expensive tooling, long lead times and high cost in new product development, time consuming and complicated tooling setup, and high cost in repairs of damaged tools, since the entire mold must be taken out of the machine to repair one damaged component.

A machine with a horizontal clamp and shuttle plate moving perpendicular to the machine axis is described in U.S. Pat. No. 4,065,246 to Marcus. However, this patent does not provide a specific description of how different parts of this machine are formed and operate. Further, this patent does not provide means for replacing tooling components in the machine, and moreover, does not provide means for stack height reduction to accommodate a standard injection molding machine with limited daylight in the manufacturing of injection blow molding products. In other words, with this machine, the entire stack height, which is in the horizontal direction, is not reduced. The stack height is the distance between the movable platen and the immovable platen with the machine closed and the mold in the machine, that is, the thickness of the mold itself. "Daylight" is the distance between the movable platen and the immovable platen with the machine open. The opening distance permits for interchangeable tooling.

There are machines with modular tooling set-up known to the industry, and developed by the inventor of the present invention, but not described in any publications. However, these machines have a mold in them with an overall stack height of around 32–35 inches, and to provide an opening of about 16–20 inches, would require daylight of about 48–54 inches. This stack height, however, does not permit the use of a small standard injection-molding machine as a base machine. Using special injection machines with extended daylight and large tonnage which is not needed in manufacturing of injection molded parisons is not economical. At the same time, when using a big machine, a large number of cavities must be formed to make the machine profitable. A large number of cavities, on the other hand, defeats the purpose of interchangeability of the machine components, because every time a component has to be changed, the machine must be stopped and restarted again. It is a complicated process to restart a machine with a large number of cavities varying to a great deal in shapes and sizes, and this leads to a lot of wasted material during the start-up and a great loss in production. Small machines will provide better start-ups, will be more flexible in production scheduling, and enable the manufacturers to run products made from different materials and colors more readily.

The present invention, on the other hand, enables manufacturers of plastic containers to move the machine close to the customer and provide the customer with all different sizes and shapes needed, without the additional expense of shipping and packing of the finished product, while also reducing the stack height of the machine.

SUMMARY OF THE INVENTION

It is an object of this invention to provide an injection blow-molding machine with a minimum stack height for the purpose of accommodating a standard injection molding machine with limited daylight as a base machine in manufacturing injection blow-molded products of various sizes and configurations.

It is still another object of this invention to provide an injection blow-molding machine with a new and improved shuttle assembly having minimum stack height with interchangeability in the machine core pins and neck ring adapters.

It is yet another object of this invention to provide an injection-molding machine with new and improved slide assemblies having a minimal stack height and interchangeability in the machine neck rings.

It is a further object of this invention to provide a new and improved injection blow-molding machine with new and improved blow-mold assemblies, having a minimal stack height with interchangeability in the machine blow cavities.

It is a still further object of this invention to provide a new and improved injection blow-molding machine with a new and improved injection-mold assembly with minimal stack height, having interchangeability in the machine injection cavities.

It is a yet further object of this invention to provide a new and improved injection blow-molding machine with a new and improved take off station with minimal stack height having removability in the machine pick-off pins and stripper bushings to take off bottles with different neck finishes.

In accordance with an aspect of the present invention, an injection blow molding machine utilizing an extruder and having interchangeable machine tooling components, for manufacturing injection blow molded articles of different configurations and sizes, includes a stationary machine platen; a movable machine platen which is movable toward and away from the stationary machine platen along a machine axis, to close and open a mold; opposite support structure mounted to the movable platen; a shuttle assembly mounted on the movable machine platen between the opposite support structure for movement with the movable machine platen, the shuttle assembly including a shuttle plate movable perpendicular to the machine axis and having a rear surface in close proximity to the movable machine platen; at least one core pin retainer mounted on the shuttle plate for movement therewith, each core pin retainer holding a core pin that receives a parison to be blown into a bottle; slides movably mounted on the shuttle plate for movement with the shuttle plate and movable toward and away from each other in close proximity to a front surface of the shuttle plate around the at least one core pin retainer mounted on the shuttle plate, the slides having interchangeable neck rings; an injection mold with interchangeable injection cavities mounted on the stationary platen; at least one blow mold cavities, the at least one blow mold assembly fixed relative to and positioned adjacent to the stationary machine platen; and at least one take off station mounted on the shuttle plate and including interchangeable pick off pins and stripper bushings movable along the pick off pins for removing a blown bottle on the pick off pins.

Each take off station includes take off pins on which blown bottles are positioned; stripper bushings formed around the take off pins; and at least one plate reciprocally movable along the take off pins to remove the bottles from the take off pins.

Further, there are two rails mounted on the stationary platen and the at least one blow mold assembly is formed between the two rails.

Also, each core pin retainer further includes an interchangeable neck ring adapter, and is formed with openings to bring temperature controlled liquids and gases to the core pin.

At least one manifold is formed on the shuttle plate, to bring the temperature controlled liquids and gases to the core pin retainers.

The opposite support structure for supporting the shuttle assembly, includes two horizontally mounted and parallel guide rails secured to the movable platen; bearing blocks movable on the guide rails; vertical plates secured to the bearing blocks so as to be movable therewith along the guide rails, with the shuttle plate being secured to the vertical plates to reciprocally move the shuttle plate in a direction perpendicular to the machine axis. Tie rods extend along the machine axis, and there are plates secured to the movable platen and mounted around the tie rods for movement of the movable platen along the machine axis. The guide rails are secured to the plates that are secured to the movable platen, and the shuttle plate is positioned between the plates. In addition, cross bars are provided which connect ends of the parallel guide rails to each other, to increase rigidity of the shuttle assembly.

A structural angle is connected with the guide rails, to provide additional rigidity; and adjustment bolts are also provided which connect the structural angle to the cross bars assembly to ensure a perfect alignment between components of the machine during machine closing.

In one embodiment, rails are formed on a floor surface parallel to the machine axis; adjustable extensions connect the parallel guide rails together; and bearing blocks are mounted on lower ends of the adjustable extensions and ridable on the rails during a mold closing operation to prevent the machine from rocking during traverse of the shuttle plate.

Stationary plates are precisely located relative to the stationary machine platen; and upper and lower parallel rails are formed on the stationary plates. The at least one blow mold assembly is formed between the upper and lower parallel rails.

Tie rods extend along the machine axis; and there are two pair of the stationary plates formed around the tie rods. Also, the vertical bars are formed between the upper and lower rails on both sides of the stationary platen, to increase the rigidity of the upper and lower rails which support the at least one blow mold assembly; and precise spacers are formed between the at least one blow mold assembly and the upper and lower rails to ensure a perfect vertical alignment between the slides and the at least one blow mold assembly.

Also, rods are formed on the spacers; and a number of bearings are formed at a bottom and top of the slides to ride on the rods, during opening and closing of the at least one blow mold assembly.

Further, the vertical bars are formed with openings; and rods extend through the openings, with bearings mounted on a rear portion of the slides for riding on the rods, to prevent the at least one blow mold assembly from shifting in the direction of the machine axis. A number of openings are formed in the vertical bars to retain blow mold plugs which form a bottom of a product blown from the parison.

Support beams are also provided for supporting the at least one blow mold assembly on a factory floor, the support beams including adjustable machine mounts formed between the lower rail and the factory floor.

The slides include interchangeable blow cavities precisely located thereon which are aligned during blow mold closing.

Also, stationary plates are mounted on the stationary platen, and the injection mold with interchangeable injection cavities, is precisely located between the stationary plates.

Tubes are formed above a front surface of the shuttle plate, to bring cooling fluids and compressed gases needed for temperature conditioning of the core pins, with minimum heat loss through the shuttle plate to surrounding machine and mold components.

Retainer blocks are mounted on the shuttle plate; and retainer rods retain the slides on the shuttle plate, the retainer rods mounted for movement inside the retainer blocks.

The retainer blocks have bottom surfaces; and springs are formed at the bottom surfaces of the retainer blocks, to lift the slides off the front surface of the shuttle plate, so as to prevent wear of the slides and damage to the neck rings during opening and closing of the slides. There are at least two pair of the slides, with one slide of each pair moving in the same direction during opening and closing of the neck rings, and connected to each other through the retaining rods so as to move together, while the other slides of each pair move in an opposite direction and slide on the retaining rods. The retainer rods are hollow and are provided with a number of openings to bring cooling fluids to those ones of the slides, to which the retaining rods are permanently connected. Seals are formed between the hollow rods and the slides attached to each other, to provide sealing of cooling fluids; and bushings are formed inside each slide to ensure smooth movement with minimum friction of the retainer rods inside the slides and to provide an alignment between the slides. Bushings are also formed in the retainer blocks so that the retainer rods can move with minimum friction inside the retainer blocks during opening and closing of the slides.

In the machine, two blow mold halves are movable toward and away from each other, each blow mold half having a first half cavity which together form a blow mold cavity when the two blow mold halves are moved toward each other into abutment, the blow mold cavity being open at opposite axial ends thereof, and each blow mold half having a second half cavity which together form a plug cavity when the blow mold halves are moved toward each other into abutment, with one core pin having a parison thereon being insertable into one axial opening of the blow mold cavity; and a blow mold plug is mounted within and along a center line of the blow mold cavity and within the plug cavity; and a blow plug insert axially movable into the other axial opening of the blow mold cavity to provide guidance during stretching of the parison in the axial direction.

The blow plug insert includes a first cylindrical portion of a first diameter axially movable into the other axial opening of the blow mold cavity, and a second cylindrical portion of a second, lesser diameter and connected with the first cylindrical portion, axially movable within the blow mold plug, the second cylindrical portion forwardly expandable by pressure applied to a bottom of the small cylindrical portion to contact the parison, and retractable under high pressure applied to the large cylindrical portion, after high pressure is introduced inside the parison, stretching the parison, while axially guiding the parison.

The invention accordingly is comprised of the features of construction, combination of elements, and arrangements of parts which will be exemplified in the system, device, and article of manufacture hereinafter described and of which the scope of application is as elucidated hereinafter, as will be indicated in the appended claims. In this regard, numerous alternatives within the scope of the present invention, besides those alternatives, preferred embodiments or modes practicing the invention supra, and those to be elucidated, will occur to those skilled in the art.

Others objects, features and advantages of the invention in its details of construction and arrangements of parts will be seen from the above, from the following description of the preferred embodiment when considered with the drawing and from the appended claims. In addition, these and other objects and advantages of the present invention will become evident from the description, which follows.

DESCRIPTION OF THE PREFERRED EMBODIMENTS

Figure 1:
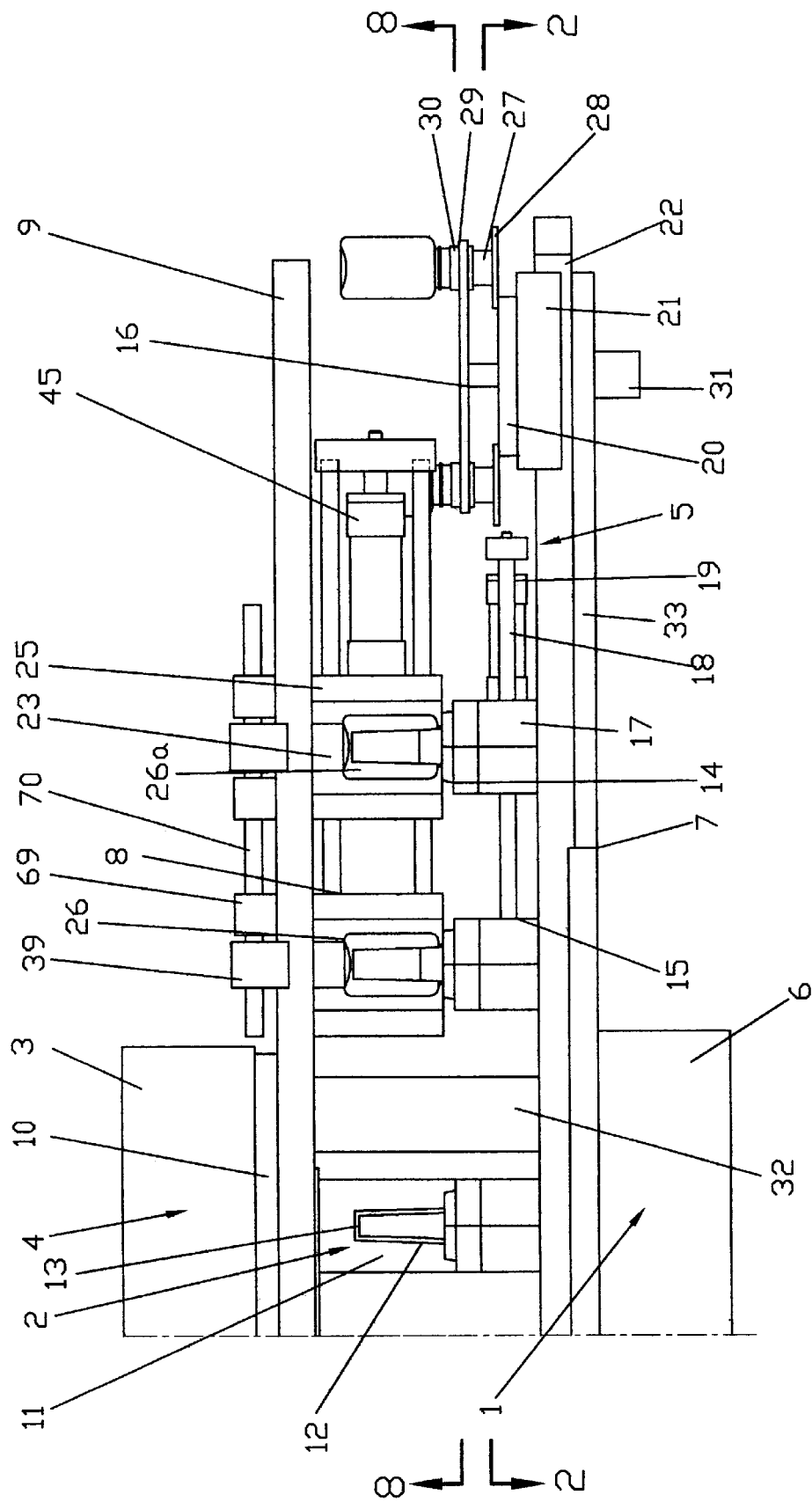
FIG. 1 is a top plan view of a right half section of an injection blow-molding machine incorporating the instant invention showing the press in the closed position, with the left half section being a mirror image thereof.

Referring first to FIG. 1, there is generally shown a top view of a right side half of an injection blow molding machine 1 in a closed position. Injection blow molding machine 1 is formed by an arrangement of a number of major subassemblies. Specifically, an injection mold 2 is formed on an immovable or stationary platen 3 of an injection molding machine 4, for supplying material to form the parisons used to form the blown bottle. A shuttle plate assembly 5 is formed on a movable platen 6 of injection molding machine 4, such that shuttle plate assembly 5 can move toward and away from stationary platen 3 and left and right with respect thereto. In this regard, a pair of plates 7 and 7a are fixed by bolts 6a to movable platen 6, and are formed around machine tie rods 32 (FIG. 2), for sliding movement on tie rods 32 or for movement with tie rods 32, depending on base machine design, in order to move movable platen 6 toward and away from stationary platen 3.

Figure 8:
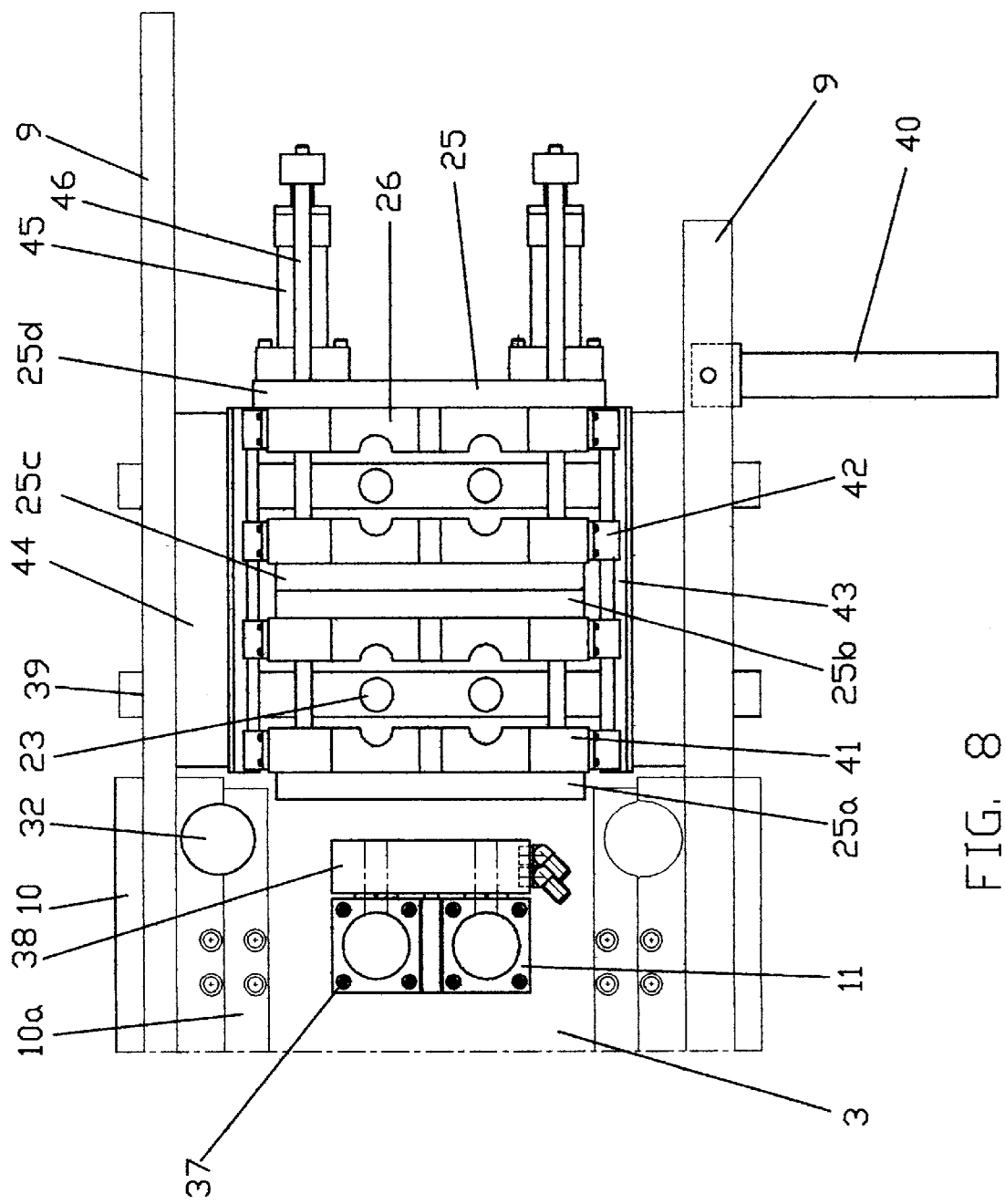
FIG. 8 is a front elevational view of one half of the injection blow-molding machine showing the blow-mold assembly with interchangeable blow cavities and a portion of the injection mold with interchangeable cavities movable relative to a manifold, viewed from line 8—8 of FIG. 1.

Two blow stations or blow mold assemblies 8 are formed, one on the left side (not shown in FIG. 1) and one on the right side of stationary platen 3. Blow mold assemblies 8 are mounted between two parallel bars 9, as shown in FIGS. 1 and 8, with parallel bars 9 formed on a pair of plates 10 and 10a through which tie rods 32 extend. Plates 10 and 10a are movable along tie rods 32 or movable with tie rods 32, depending upon base machine design. In correspondence with blow mold assemblies 8, two slide assemblies 15 are formed on a movable platen of shuttle plate assembly 5, one on the left side (one-half being shown against the injection cavity in FIG. 1) and one on the right side (shown against the blow molds in FIG. 1).

In addition, two take off stations 16 are formed on both ends of shuttle assembly 5, one on the left side (not shown in FIG. 1) and one on the right side.

Injection mold 2 includes one or more injection cavities 11, each of which forms an outside configuration of an injection molded parison 13. Preferably, there are four injection cavities 11 arranged in a square configuration, although the present invention is not limited thereby. A core pin 12 forms the inside configuration of each parison 13, that is, each parison 13 is formed in a hot state on a respective core pin 12, and when core pins 12 are removed from injection cavities 11, core pins 12 transfer parisons 13 to blow mold assemblies 8, providing a temperature conditioning of the parisons during the transfer time needed to blow parisons 13 into a final product at blow mold assemblies 8. Core pins 12 are movable with shuttle plate assembly 5 relative to stationary platen 3 and injection cavities 11.

Figure 7:
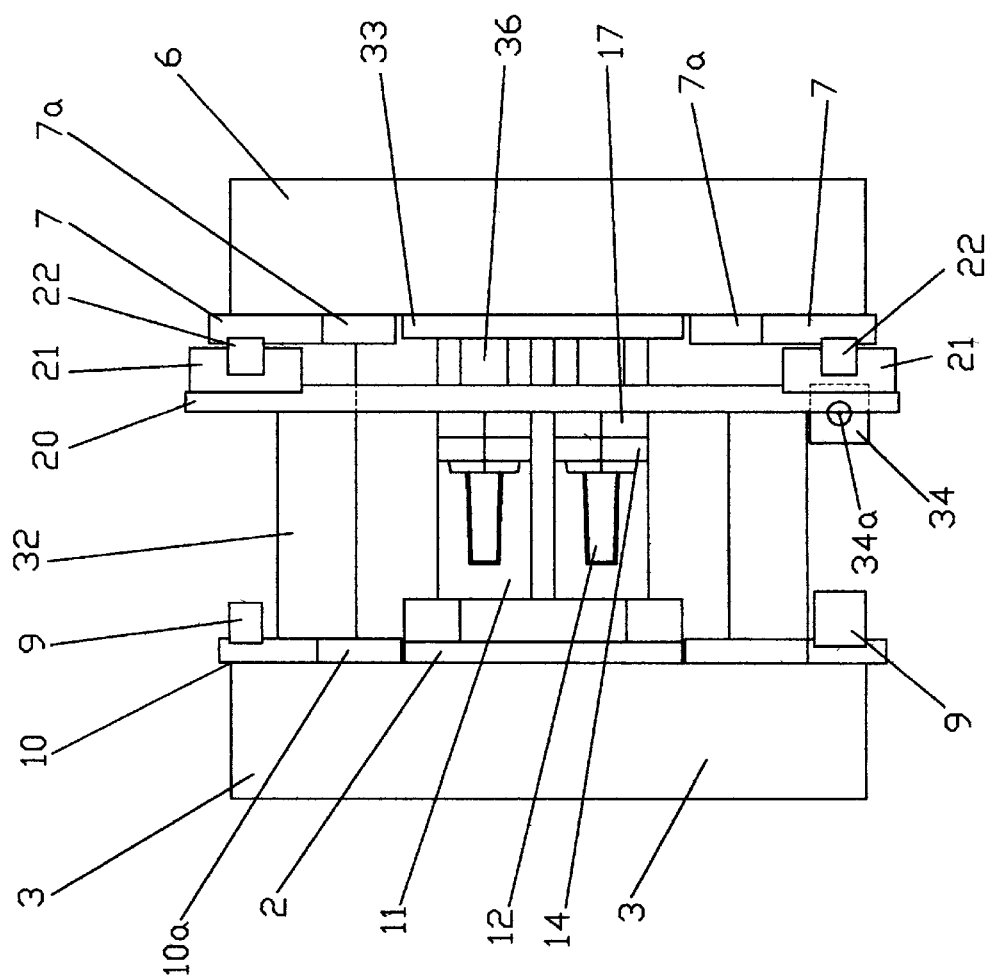
FIG. 7 is a side elevational view of the injection blow-molding machine, showing the shuttle plate assembly with core pins and the injection mold in a closed position.
Figure 9:
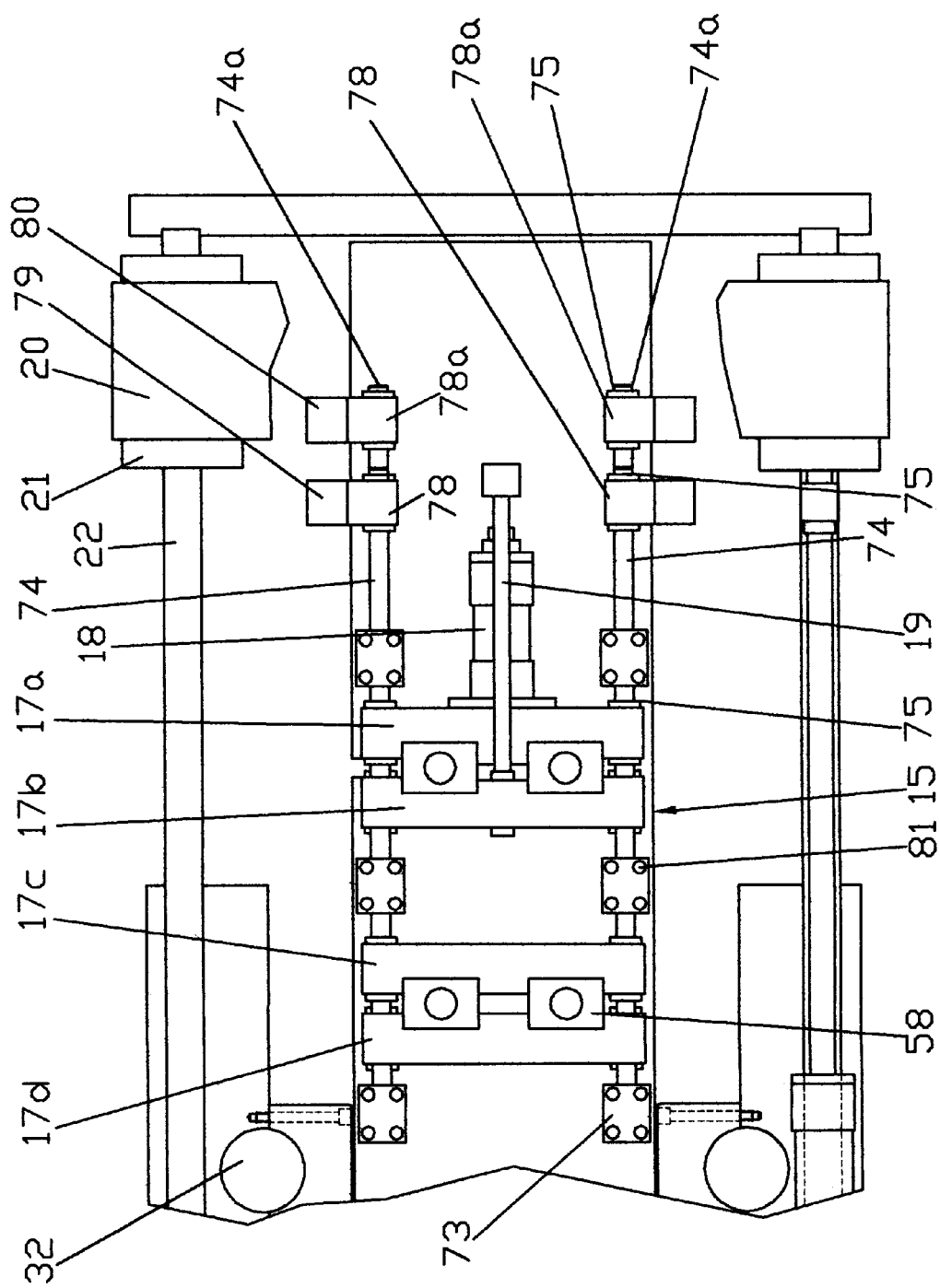
FIG. 9 is a front elevational view of a half section of the shuttle assembly with one slide assembly mounted on the shuttle plate.
Figure 10:
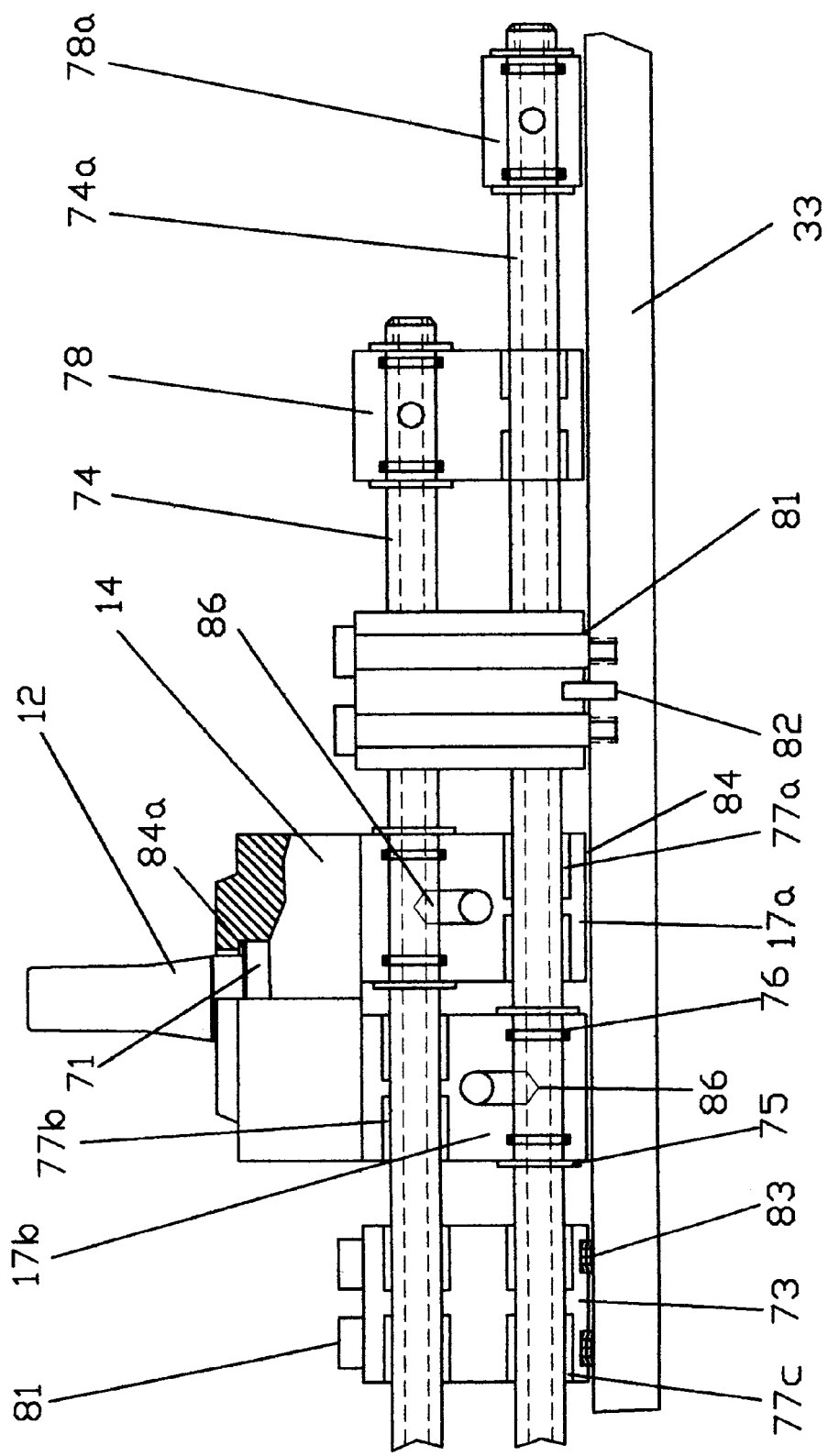
FIG. 10 is a partial side elevational view, partly in section, of the injection blow-molding machine, showing one slide assembly mounted on the shuttle plate.

As is well known, and as shown in FIGS. 1, 7 and 10, halves of a neck ring 14 are formed at the lower end of each core pin 12 and form the neck finish of a molded parison which forms the final bottle. Neck rings 14 have internal threads which, in addition to forming the neck finish, function to pull the parison 13 out from the respective injection cavity 11 for transport to a blow mold assemblies 8. The halves of a neck ring 14 associated with each core pin 12 are formed on top of two respective slides 17 of slide assemblies 15. Each pair of two slides 17 can be moved by a push pull rod 19 associated with a cylinder 18, in opposite directions transverse to tie rods 32, to open and close neck rings 14 in accordance with the machine sequence, as will be described in more detail in relation to FIG. 9. Thus, slides 17 are closed when a parison 13 is formed over a core pin 12, and are opened when the bottle is blown and it is necessary to remove the bottle from the pin. Slides 17 includes the neck rings 14 for forming the necks of the blown bottles.

A shuttle plate 33 of shuttle assembly 5 is attached through vertical plates 20 to four sets of bearing blocks 21 which are movable on two parallel guide rails 22 that are fixed to plates 7 by bolts 22a, as shown in FIGS. 1, 2, 4 and 5.

Each blow mold assembly 8 includes four blow mold plates 25, preferably arranged in a square configuration corresponding to the square configuration of injection cavities 11. However, it will be appreciated that the number of blow mold plates 25 can vary within the scope of the invention. Blow mold plates 25 are formed between guide rails 9, as shown in FIGS. 1 and 8.

A number of blow mold halves 26 are formed on plates 25, and have blow mold cavities 26a. Blow mold plugs 23, used to form the bottom surfaces of the blown bottles, are formed on vertical bars 39. Blow station plates 25 can be opened and closed in accordance with a machine sequence. When closed, two complementary blow mold halves 26 move into abutment to define a single closed blow mold cavity 26a, in conjunction with blow mold plugs 23 and neck rings 14.

As shown in FIG. 8, a pair of end blocks 41 are formed at each end of blow mold plates 25. Bearings 42 are attached to end blocks 41, and are movable along guide rails 43. Guide rails 43 are mounted on precise spacer blocks 44, which are mounted between parallel bars 9 and support and precisely position blow mold assembly 8, in the vertical direction. Legs or support beams 40 are formed to support the blow mold frame construction to the factory floor. Thus, blow mold plates 25 are movable toward and away from each other along guide rails 43.

Further, blow mold plates 25 are formed with upper extensions or bushings 69 that are slidably mounted on rods 70 for additional sliding support, with rods 70 fixedly connected with vertical bars 39 that are, in turn, fixed to guide rails 9. Thus, blow mold plates 25 are also slidable along rods 70 in the left to right, and right to left directions of FIG. 1.

Blow station plates 25 can be opened and closed in accordance with a machine sequence by upper and lower blow mold cylinders 45 and push pull rods 46. Cylinders 45 are preferably hydraulic cylinders with push pull rods 46 extending therein. Cylinders 45 are connected to the rightmost blow station plate 25a in FIG. 8, with the leftmost ends of push pull rods 46 being connected with the corresponding next blow station plate 25b. Thus, actuation of cylinders 45 causes blow station plates 25a and 25b to move together or apart.

Blow station plates 25c and 25d are also slidably mounted on push pull rods 46, with blow station plate 25c connected with blow station plate 25a, and with blow station plate 25d connected with blow station plate 25b, so that they move in synchronism. When blow station plates 25b and 25c are in their fully opened position, as shown in FIG. 8, they are in abutment with each other.

A take off station 16 is formed on each side of the apparatus, only the right side being shown in FIG. 1. Each take off station 16 is mounted on a movable platen to facilitate the removal of blown bottles from the blow molds during clamp opening, to transfer blown bottles during traverse of shuttle plate 33 and to eject the bottles onto take away or packing stations. A plurality, for example, four in a square configuration, of take off pins 27 are formed on plates 28. Plates 28 are attached to vertical plate 20, which moves on bearing blocks 21 perpendicular to the axis of the machine, that is, in the left to right direction of FIG. 1. Stripper bushings 30 are formed around take off pins 27 and rest on plate 29. A stripper plate cylinder 31 is provided to move plate 29 in an up and down direction of FIG. 1, in accordance with the sequence of machine operation. During this movement of plate 29, stripper bushings 30 move forward along take off pins 27 and remove the blown bottles from take off pins 27.

Figure 2:
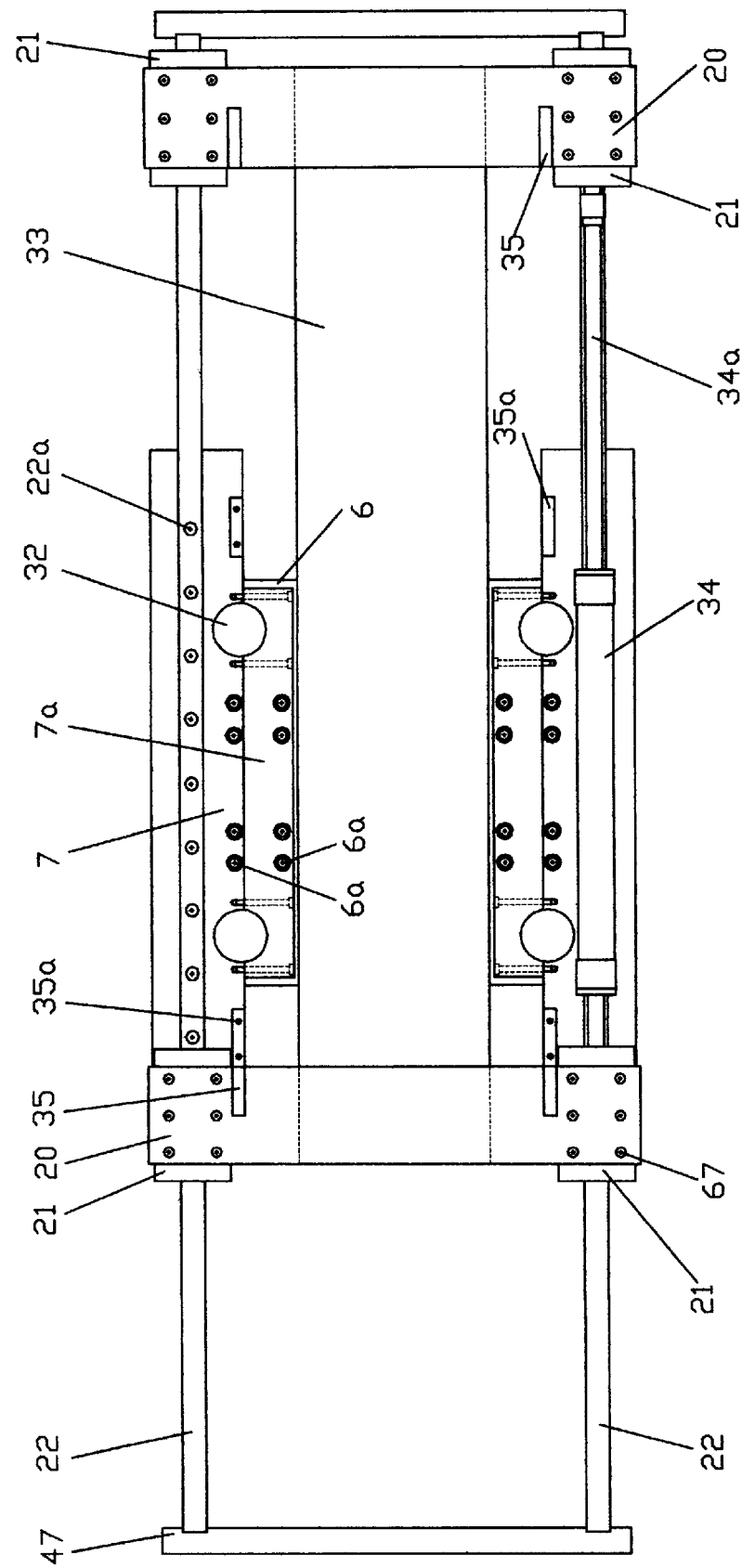
FIG. 2 is a front elevational view of the shuttle plate assembly of the injection blow-molding machine, shown along line 2—2 of FIG. 1.

Referring to FIG. 2, there is generally shown a front elevational view of the entire shuttle plate assembly 5, that is, both left and right sides, in comparison with only the right side being shown in FIG. 1. As shown, and as described above, shuttle plate assembly 5 includes the pair of plates 7 and 7a placed at the top and bottom of movable platen 6, and extending around tie rods 32. This arrangement provides a precise alignment between machine assemblies formed on immovable and movable platens 3 and 6 during machine closing, without altering the standard platen of a standard injection molding machine. Other means of precisely positioning plates 7 and 7a on movable platen 6, such as dowel pins (not shown) can be used with special openings formed by the manufacturer on the machine platens. As discussed above, guide rails 22 are fixed to plates 7 at the top and bottom of the apparatus by bolts 22a, with bearing blocks 21 being slidable along guide rails 22. A number of vertical bars 47 are formed at both ends on guide rails 22 to increase structural rigidity, as shown in FIG. 2. Each bearing block 21 is connected to a vertical plate 20 by bolts 67. A movable plate 33 is connected to and between plates 20 through a number of spacers (not shown) by bolts and dowel pins.

A double rod or shuttle assembly cylinder 34 is formed on bottom plate 7 with a rod 34a having opposite ends connected to the bottom ones of bearing blocks 21 to facilitate movement of shuttle plate 33 perpendicular to the machine axis in accordance with a programmed machine sequence. A number of movable stop blocks 35 are formed on plates 20 and immovable stop blocks 35a are formed on plates 7, to facilitate precise alignment between assemblies in the side to side direction during machine closing.

Figure 3:
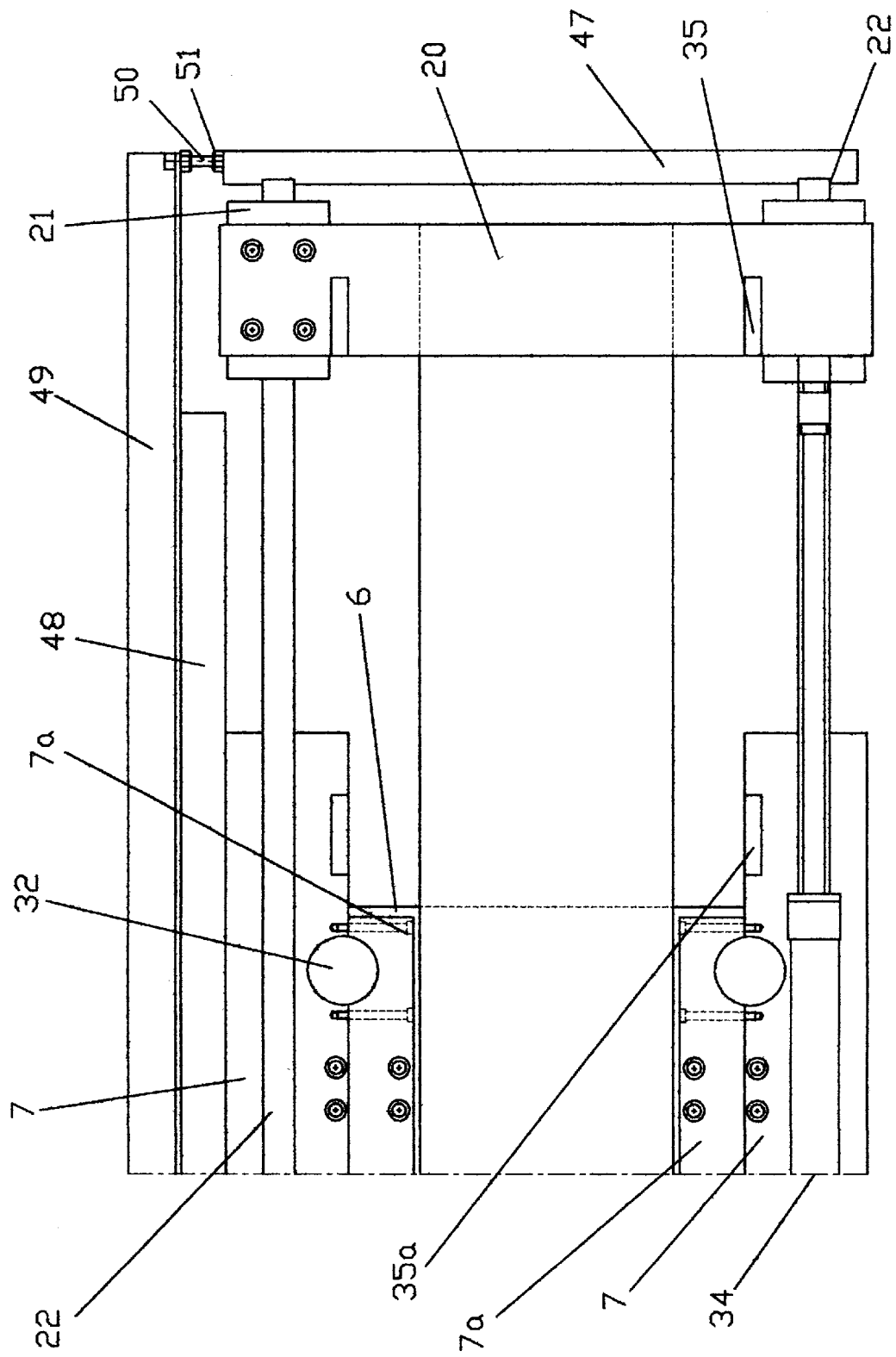
FIG. 3 is a front elevational view of a modified version of the right half section of the shuttle plate assembly with an additional structural support, formed at the top of the shuttle assembly.

With the arrangement thus far described, core pin adapters 58, slide assemblies 15 and take off station 16 are mounted on movable shuttle plate 33 which is movable in the left to right directions of FIGS. 1–3 by cylinder 34. Thus, slide assemblies 15 can be moved between injection mold 2 and blow station 8. At the same time, take off station 16 can be moved between the end position shown in FIG. 1 and a position beneath blow station 8 in order to remove blown bottles from blow station 8.

In addition to this movement, movable platen 6 which carries shuttle plate assembly 5 is movable toward and away from stationary platen 3, that is, in the direction from the top of the paper in FIG. 1 to the bottom of the paper. Thus, there is movement of shuttle plate assembly 5 in two different directions which are transverse to each other.

In addition, there is movement of slides 17 which carry neck rings 14 toward and away from each other in the manner shown in FIG. 8, with slides 17 being carried by shuttle plate assembly 5 and movable therewith.

Referring now to FIG. 3, there is shown a front elevational view of a modification to the right half of shuttle plate assembly 5 in the fully leftwise extended position of shuttle assembly cylinder 34.

Specifically, a horizontal bar 48 and an angle 49 are positioned on top of the uppermost plate 7 in FIG. 3. Due to the weight of the assembly, parallel guide rails 22 may not be exactly parallel to the ground, and vertical alignment between slide assemblies 15 and blow stations 8 may therefore not be perfect. An adjustment bolt 50 with top and bottom securing nuts 51 is positioned between angle 49 and vertical bars 47 in order to prevent sagging of guide rails 22 in order to provide precise alignment of shuttle plate assembly 5. This arrangement also further increases the structural rigidity of shuttle plate assembly 5.

Figure 4:
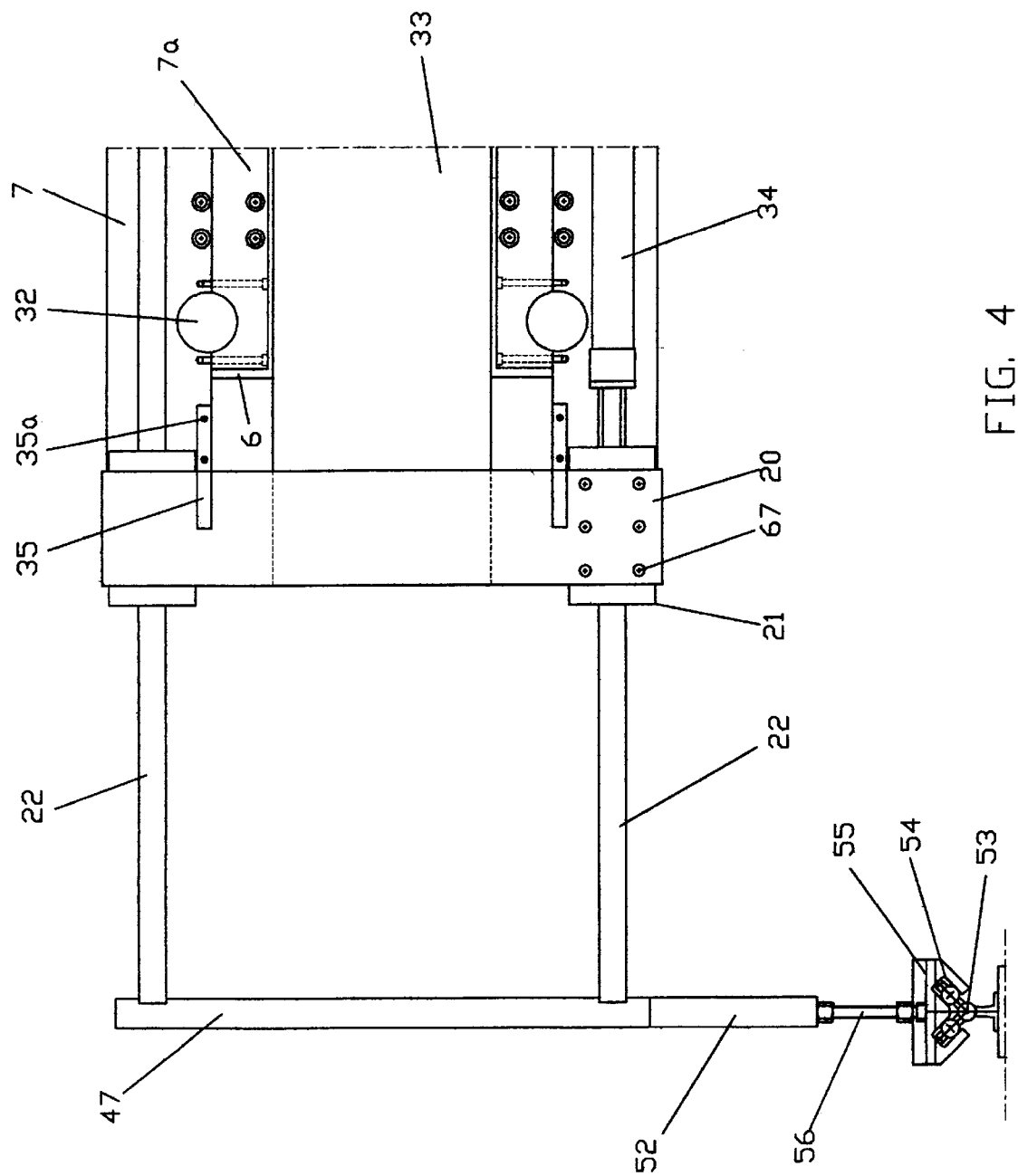
FIG. 4 is a front elevational view of a modified version of the left half section of the shuttle plate assembly with an additional structural support formed at the bottom of shuttle plate assembly.

Referring now to FIG. 4, there is shown a front elevational view of the left half of shuttle plate assembly 5, with double rod cylinder 34 in a fully retracted position so that stop blocks 35 and 35a at the left side abut against each other. In this embodiment, one of the vertical bars 47 can be extended towards the floor, or a leg or support beam 52 can be formed as an extension of the vertical bar 47. A rail assembly 53 parallel to the machine axis is bolted to the floor. A bearing block 54 rides on rail assembly 53, and is connected to support leg or beam 52 through a plate 55 and an adjustment bolt 56. This arrangement is formed to provide shuttle plate assembly 5 with additional structural rigidity. In addition, this embodiment facilitates adjustment when necessary to provide needed alignment between assemblies of injection blow molding machine 1 and prevents the entire machine from rocking during mass movement of shuttle plate assembly 5 from one side of the machine to the other.

Figure 5:
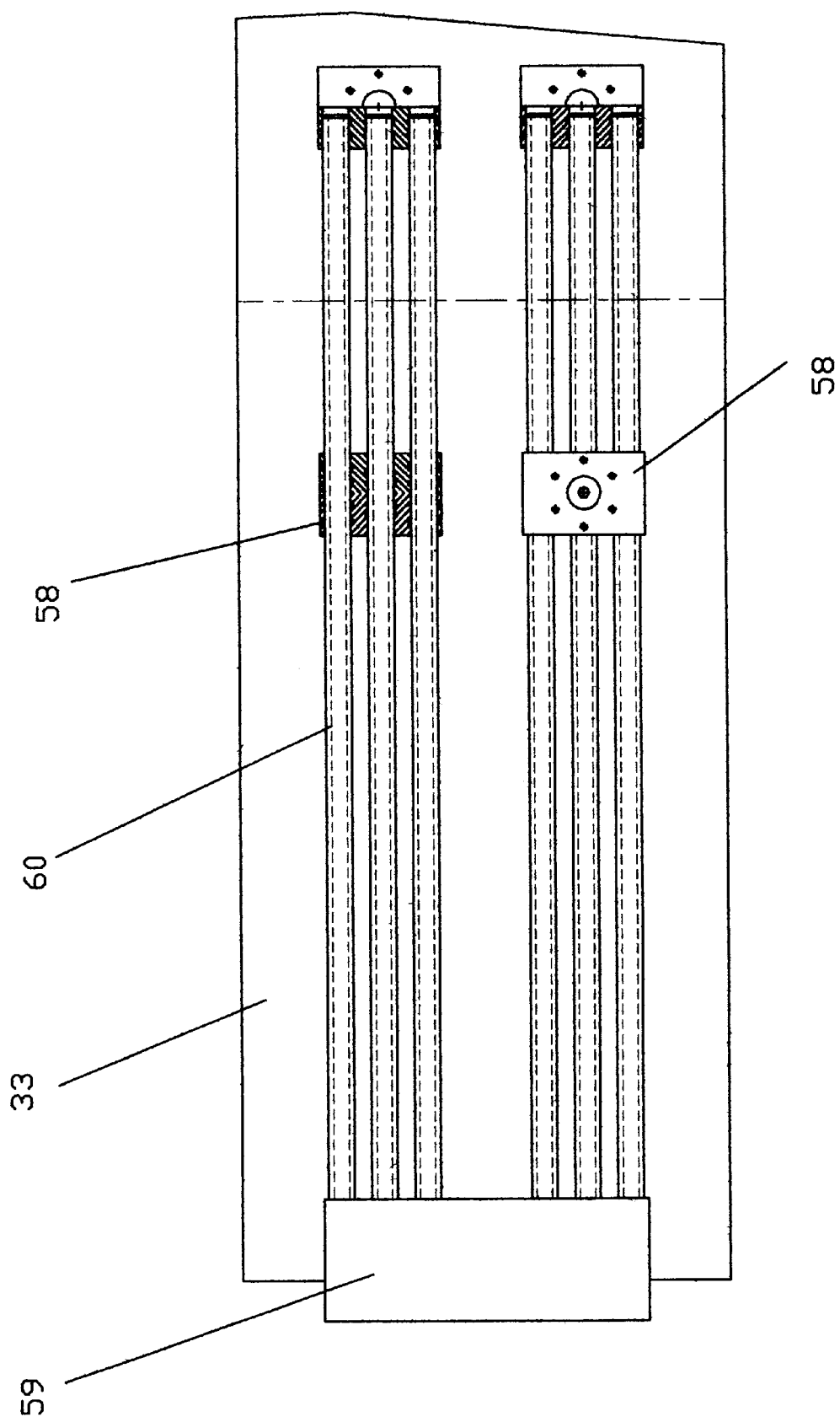
FIG. 5 is a front elevational view of a half section of a shuttle plate assembly with a manifold, core pin retainers and tubing.

Referring now to FIG. 5, shuttle plate 33 is shown with a number of core pin retainers 58 mounted thereon. Core pin retainers 58 retain interchangeable neck ring adapters 71 (FIG. 6) and core pins 12 in the machine during operation thereof. At the same time, core pin retainers 58 provide core pins 12 with fluids necessary for precise temperature control, and gases necessary to blow the end product.

In known industry arrangements, fluids and air are brought to core pins 12 through openings drilled in large supporting plates. However, the use of such large supporting plates leads to increased stack heights. In addition, since the fluids and air pass through the supporting plate, there is a tremendous amount of heat loss therethrough which is transferred through the machine platens. To compensate for the heat loss, extremely hot fluids must be used, which in turn places an additional burden on the auxiliary equipment, leads to frequent break downs and burn outs of the heaters, and results in substantial production losses. In addition to this, an unpredictable expansion of some elements of the support structure leads to an excessive stress buildup of the elements of the structure and misalignment between molding components, which leads to production quality problems.

To overcome these problems, with the present invention, manifolds 59 are formed at the ends of movable platen 33. A number of openings are formed in manifolds 59 above the surface of movable platen 33. Further, a number of thermo-insulated core pin retainers 58 are formed on movable platen 33. Core pin retainers 58 are formed with openings arranged above the surface of shuttle plate 33 at the same height as the openings in manifolds 59. In this regard, tubes 60 connect manifolds 59 with core pin retainers 58, and are formed above the top surface of shuttle plate 33 to bring hot liquids and gases from manifolds 59 to core pin retainers 58, without heat loss. This arrangement of elements provides a maximum thermo-insulation between the hot elements, namely core pin retainers 58 and tubes 60, and shuttle assembly 5. Thus, only the small areas of hot core pin retainers 58 and manifolds 59 are in actual direct contact with shuttle plate 33 through thermo-insulating materials. A number of O-ring grooves with O-rings are formed in core pin retainers 58 and manifolds 59 to provide an adequate sealing between tubes 60, core pin retainers 58 and manifolds 59.

Figure 6:
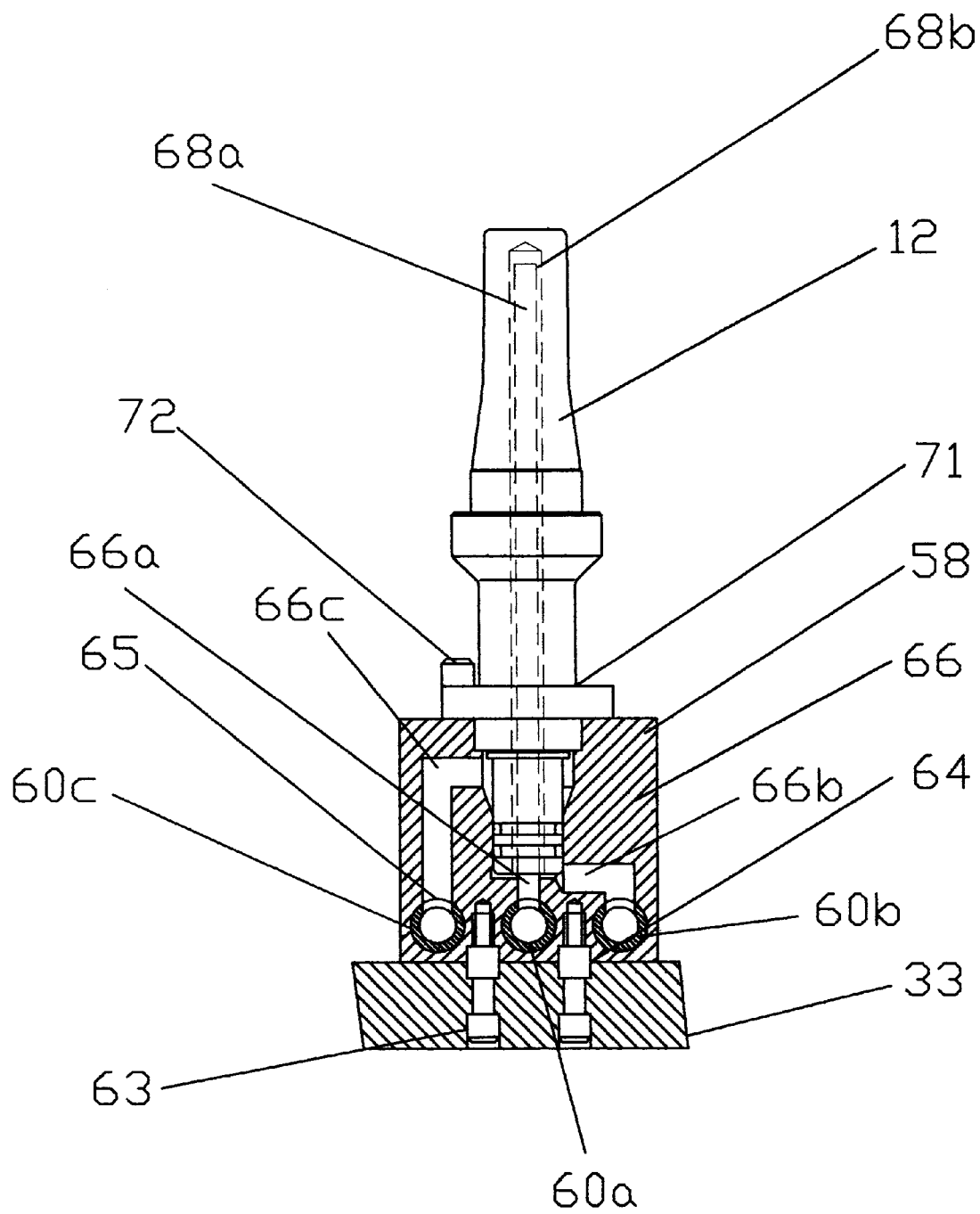
FIG. 6 is a partial cross-sectional view of a core pin retainer mounted on the shuttle plate.

Referring now to FIG. 6, there is shown a cross-section of a core pin retainer 58 with openings formed above the upper surface of shuttle plate 33. Core pin retainer 58 is mounted to shuttle plate 33 with screws 63, and precisely positioned thereon with dowels 64. A number of tubes 60 are shown extending inside core pin retainer 58. Tubes 60 bring hot fluids and gases to the respective core pin 12 through openings 65 in tubes 60, and which openings 65 are placed in line with passages 66 formed in core pin retainer 58. Passages 66 are formed inside core pin retainer 58 to bring the fluids and gases to core pin 12. Specifically, tubes 60 include a hot water inlet tube 60a which brings hot water at a temperature in the range of 150° F.–300° F. to core pin retainer 58, which temperature is sufficient to keep parison 13 soft enough to blow mold. In such case, the parison is cooled down by travel of the water in tubes 60 from about 400° F. Thus, the heated water travels from tube 60a through one passage 66a in core pin retainer 58 and up through a center passage or bubbler 68a in core pin 12.

Tubes 60 further include a hot water outlet tube 60b which returns the hot water to manifold 59. In this regard, the water travels up through center passage 68a in core pin 12 and flows up over the top thereof and then down an outer passage 68b in core pin 12, and then through a passage 66b in core pin retainer 58 and out through hot water outlet tube 60b.

Tubes 60 further include an air tube 60c which functions to bring compressed air into a passage 66c of core pin retainer 58, in order to blow the parison into the bottle. After a blowing operation, core pin retainer 58 is returned to injection mold 2 to obtain another parison 13.

Bolts 72 retain core pin 12 and neck ring adapter 71 on top of core pin retainer 58. Neck ring adapter 71 forms an inside opening, and with neck rings 14, forms the threaded neck of a blown bottle.

Referring now to FIG. 7, there is shown a side elevational view of injection mold 2 of injection blow molding machine 1, without the blow mold assembly, in a closed position. As discussed above, injection mold 2 is formed on stationary platen 3 between plates 10a on opposite sides thereof, as shown best in FIG. 8. Two parallel bars 9, formed on plates 10, are located at the top and bottom of stationary platen 3. Further, shuttle plate 33 of shuttle plate assembly 5 is formed on movable machine platen 6 between plates 7a at opposite sides thereof, and which best in FIG. 2. Cross plates 20 are formed on bearing blocks 21 and connected to shuttle plate 33 through spacers 36. Double rod cylinder 34 is formed on bottom plate 7 with opposite ends of its rod 34a being connected to bearing blocks 21. By actuating cylinder 34, shuttle plate 33 will ride on bearing blocks 21 along guide rails 22 perpendicular to the machine axis. As shown further in FIG. 7, a set of core pins 12 are positioned inside injection cavity 11.

Referring now to FIG. 8, there is shown a front elevational view of one half of injection mold 2 and a front elevational view of one blow mold assembly 8 in one half of blow molding machine 1.

As shown, removable cavities 11 of injection mold 2 are clamped to a base plate with bolts 37, with the base plate mounted to stationary platen 3. A manifold 38 provides injection cavities 11 with several zones of temperature control by bringing liquids with different temperatures to different parts of injection cavities 11. Manifold 38 can be easily moved in and out of injection cavities 11 to provide means of removing injection cavities 11 from machine 1 without a cumbersome disconnecting and reconnecting of the hoses.

The blow mold assembly 8 is formed adjacent to stationary platen 3, and between parallel bars 9. The pair of vertical bars 39 are attached to parallel bars 9 to form a rigid construction. Leg 40 supports the blow mold frame construction to the factory floor, as discussed above. As discussed above, the pair of end blocks 41 are formed at each end of blow mold plates 25, and bearings 42 are attached to the end blocks 41, bearings 42 being movable along guide rails 43. Guide rails 43 are formed on precisely located spacer blocks 44, which are formed between parallel bars 9 and support and precisely positioned blow mold assemblies 8, in the vertical direction. Two cylinders 45 through push pull rods 46 open and close blow mold halves 26, in accordance with a machine operating sequence. Blow mold plugs 23 are formed on vertical bars 39.

Referring now to FIGS. 9 and 10, there is shown a right half of shuttle plate assembly 5, shown with one slide assembly 15 formed on shuttle plate 33. The neck rings 14 are removed in FIG. 9 for ease of illustration. Each slide assembly 15 includes two pairs of slides 17, denoted as 17a, 17b and 17c, 17d, fixedly retained by upper and lower retainer rods 74 and 74a, which are slidably mounted on shuttle plate 33 by retainer blocks 73, for movement about core pin retainers 58. The tubes 60 are eliminated in FIGS. 9 and 10 for ease of illustration only. Retainer blocks 73 are attached to shuttle plate 33 with stripper bolts 81. Slides 17 in each pair move in opposite directions, towards each other or apart from each other. This movement is actuated by cylinder 18 and controlled in accordance with the machine sequence. Cylinder 18 is mounted on slide 17a with its push pull rod 19 extending through slide 17a and connected at the distal end thereof to slide 17b.

Retainer rods 74 are retained in slides 17a and 17c by retainer rings 75, so that slides 17a and 17c are connected together and move in the same direction. In like manner, retainer rods 74a are retained in slides 17b and 17d by retainer rings 75, so that slides 17b and 17d are connected together and move in the same direction.

There are two pairs of upper and lower retainer rods 74 and 74a formed as to the top and bottom of each slide assembly 15. All retainer rods 74 and 74a are hollow so as to bring cooling liquids to slides 17 and neck rings 14. It is noted that retainer rods 74 are shorter then retainer rods 74a and are placed above retainer rods 74a. Each retainer rod 74, while attached to slides 17a and 17c through retainer rings 75, moves freely on bushings formed inside adjacent slides 17b and 17d. In like manner, each retainer rod 74a, while being attached to slides 17b and 17d through retainer rings 75, moves freely on bushings formed inside adjacent slides 17a and 17c. This arrangement provides a perfect alignment between slides 17 and allows all retainer rods 74, 74a to work as retainers of slides 17 to shuttle plate 33. All retainer rods 74, 74a therefore slide on bushings formed inside respective retainer blocks 73.

Retainer blocks 73 are spring loaded, and precisely positioned on shuttle plate 33 by dowel pins 82, and retained by stripper bolts 81. Retainer blocks 73 are spring loaded to provide a gap between moving slides 17 and shuttle plate 33 to prevent them from wearing one against the other when opening and closing the same. Dowel pins 82 ensure precise location of blocks 73 and guide blocks 73 when blocks 73 move under the force of springs 83, during a clamp opening operation.

Manifolds 79, through blocks 78 and retainer rings 75, are attached to short retainer rods 74, while manifolds 80, through blocks 78a and retainer rings 75, are attached to long retainer rods 74a. Manifolds 79 and 80 move together with retainer rods 74, 74a during the opening and closing of slides 17 and are formed to provide slides 17 and neck rings 14 with cooling fluids. Thus, blocks 78 and 78a at the end of retainer rods 74 and 74a, bring cooling fluids from manifolds 79 and 80 to retainer rods 74 and 74a. Block 78 is connected to manifold 79, and through retainer rings 75, to retainer rod 74. Block 78a is connected to manifold 80, and through retainer rings 75, to rod 74a. During opening and closing of slides 17, blocks 78 and 78a move together with retainer rods 74 and 74a.

With specific reference to FIG. 10, there is shown a partial cross-section of a slide assembly 15 of the present invention. The spring loaded retainer block 73 shown at the left of FIG. 10, shows two openings formed at the bottom of the block to retain springs 83, which push retainer blocks 73 against the heads of stripper bolts 81, thereby also pushing up retainer rods 74, 74a and slides 17, providing a gap 84 between slides 17 and shuttle plate 33. This gap 84 prevents wear between shuttle plate 33 and slides 17.

At the same time, a gap 84a is formed between neck rings 14 and neck ring adapters 71, so as to prevent damage to neck rings 14 and adapters 71 during closing of slides 17 due to interference between neck rings 14 and adapters 71. A clamping force, applied to the top surface of neck rings 14 during closing of the machine, closes gap 84a and prevents flashing of parison 13 during the injection operation.

Further, two through openings with pressed in bushings 77c are formed in spring loaded blocks 73 above openings for springs 83, to retain retainer rods 74 and 74a, and by retainer rods 74 and 74a, the entire slide assemblies 15 on shuttle plate 33. During opening and closing of slides 17, rods 74 and 74a move inside retainer blocks 73, keeping slide assemblies 15 on shuttle plate 33. Upper retainer rod 74 is connected to slide 17a with retainer rings 75 and moves inside slide 17b on bushings 77b, while lower retainer rod 74a is connected to slide 74b with retainer rings 75 and moves inside slide 74a on bushings 77a.

An opening is formed along retainer rods 74, 74a to bring cooling liquids to slides 17. Specifically, two openings 86 formed on each retaining rod inside slides 17, between retaining rings 75, bring cooling liquids to slides 17. Each of these openings 86 is sealed by O-rings 76 placed in grooves formed inside slides 17 which move together with retainer rods 74, 74a.

As will be appreciated from the structure described so far above, the present invention provides a reduced daylight, that is, the distance between stationary platen 3 and movable platen 6 in the open condition of the machine, and a stack height of about 16 inches, with the daylight similar to the aforementioned smaller machines with modular tooling set-up known to the industry, and developed by the inventor of the present invention, but not described in any publications, but which permit easy interchangeability of tooling and which can be used in the same manner as a base machine having a large number of cavities which are necessary to make the machine profitable. This is the result of various structural features of the present invention not disclosed or shown in the prior art.

Specifically, shuttle plate 33 is formed with its rear surface in close proximity to movable machine platen 6 in the direction of the machine axis, as best shown in FIG. 7. This is because shuttle plate 33 is mounted on movable machine platen 6 between opposite support structure for movement with movable machine platen 6 and movable perpendicular to the machine axis, such that the rear surface of shuttle plate 33 is in close proximity to movable machine platen 6. The opposite support structure includes a pair of plates 7 and 7a formed around machine tie rods 32 and fixed to movable platen 6 by bolts 6a.

This is very different from the prior art which required many different plates that movably supported the shuttle plate in spaced relation from the movable machine platen.

Further, in order to reduce the stack height, two slide assemblies 15 with slides 17 are movably mounted on shuttle plate 33 for movement with shuttle plate 33 and movable toward and away from each other in close proximity to a front surface of shuttle plate 33 around core pin retainers 58, as shown in FIGS. 9 and 10. According to the present invention, core pin retainers 58 are mounted on shuttle plate 33. This is very different from the prior art in which the core pin retainers were mounted on a manifold plate. By eliminating the manifold plate between the core pin retainers and the shuttle plate, the stack height is further reduced.

In order to further reduce the stack height, blow mold assemblies 8 are formed adjacent to, that is, in-line with stationary machine platen 6. This occurs by reason of mounting blow mold assemblies 8 between two parallel bars 9, formed on plates 10, and located at the top and bottom of stationary platen 3.

Figure 11:
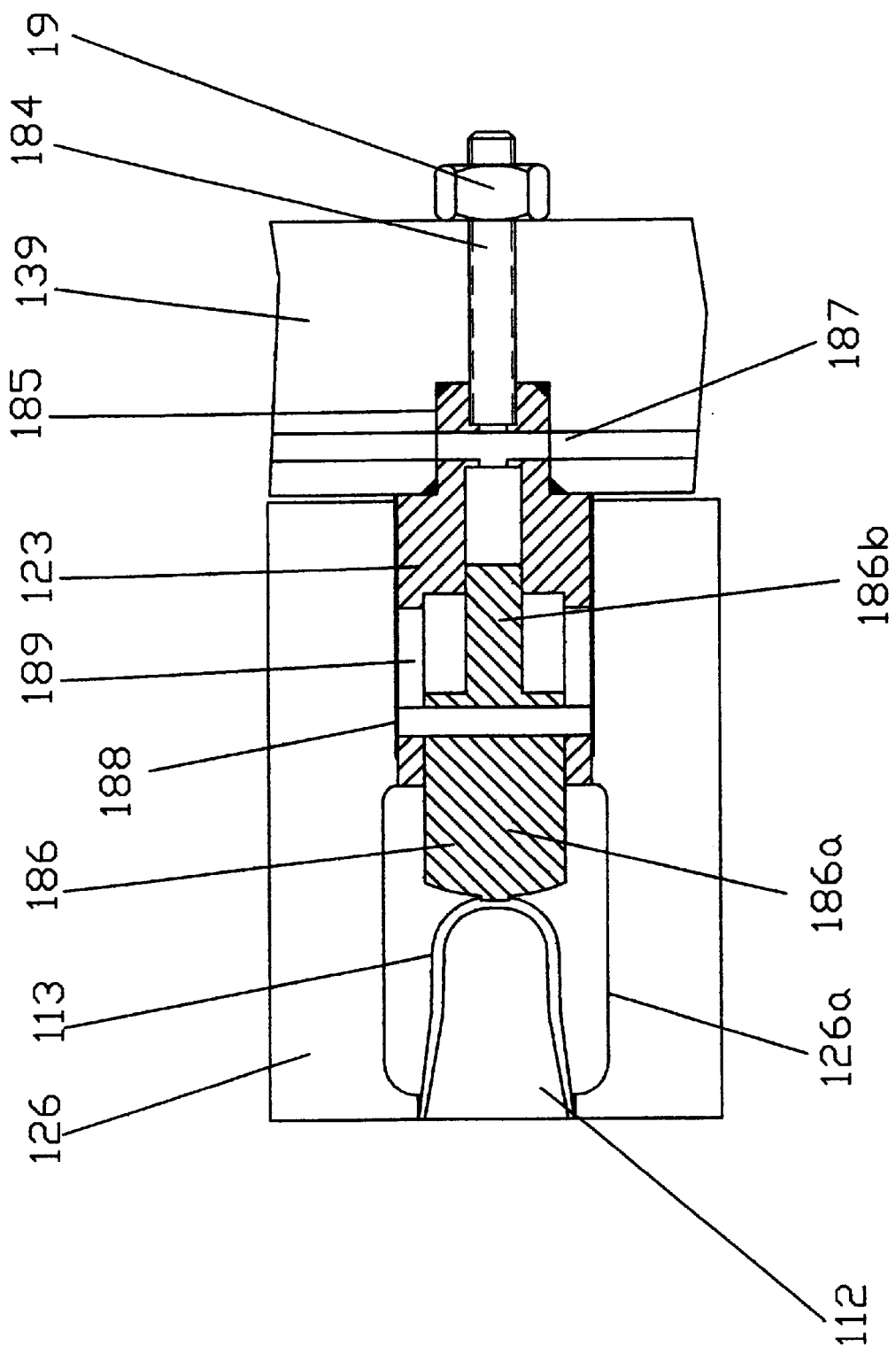
FIG. 11 is a partial cross-section of a blow mold with an expandable blow plug according to another embodiment of the present invention.

Referring now FIG. 11, there is shown a cross-section of an expandable blow mold plug 123 and a blow mold half 126, according to another embodiment of the present invention, in which elements corresponding to those of the first embodiment are referred to by the same numerals, but augmented by 100. A parison 113 formed on a core pin 112 is shown inserted into blow mold cavity 126a of blow mold half 126. In the next step of the process, the blowing of a finished bottle will occur, in accordance with the machine sequence.

This arrangement is made to facilitate a manufacturing of a stretch blown bottle. Specifically, to produce a bottle with good barrier properties, some materials should be stretched along the bottle axis, as well as perpendicular to the bottle axis. In the prior art, a special expendable rod is introduced inside the parison to guide the blowing of the parison along its axis, to prevent it from drifting off the center and to insure a uniform wall thickness in the finished bottle. These arrangements are cumbersome and require a withdrawal of core pins from the preform and an introduction of a special stretch rod. Parisons should be oriented vertically to prevent sagging during the period between the core pin withdrawal and the insertion of the stretch rod.

The expandable blow mold plug arrangement of present invention of FIG. 11 provides the needed guidance along the parison axis during expansion, eliminating the need of a stretch rod arrangement. Specifically, blow mold plug 123 of the present invention is retained on vertical bar 139 by a threaded rod 184 with a nut 190. A number of precise openings 185 are formed in vertical bars 139 to ensure the proper location of blow mold plugs 123 in relation to blow mold halves 126. Each blow mold plug 123 is formed with two concentric openings of different diameters to accommodate a blow mold plug insert 186 which is formed by two cylindrical portions 186a and 186b of different diameters and connected together. Openings 187 are formed in vertical bar 39 to bring low pressure air to the bottom of small cylindrical portion 186b of plug insert 186. The air pressure therefore drives plug insert 186 out of blow mold plug 123 until dowels 188 in blow mold plug insert 186 meet the end of grooves 189 formed in blow mold plug 123.

Parison 113 enters blow cavity 126 during the closing of machine 1 and is compressed between core pin 112 and the top of blow mold plug insert 186. The force of the squeeze will be determined by the area of small cylindrical portion 186b of blow mold plug insert 186, which will act as a piston, and the air pressure delivered to the bottom of small cylindrical portion 186b through openings 187. During blowing of the bottles, the high air pressure will be introduced inside parisons 113. This high pressure will be transmitted to the top of large cylindrical portion 186a through the preform wall. As the preform continues to expand, the larger area of large cylindrical portion 186a will be exposed to high pressure, and the force applied to the top of large cylindrical portion 186a will increase and will drive blow mold plug insert 186 inside blow mold plug 123. A constant force applied to the bottom of small cylindrical portion 186b will keep the preform compressed against the top of blow mold plug insert 186 and will guide the preform along the blow cavity axis during expansion into a final bottle.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope or spirit of the invention as defined by the appended claims.

What is claimed is:

1. An injection blow molding machine utilizing an extruder and having interchangeable machine tooling components, for manufacturing injection blow molded articles of different configurations and sizes, said injection blow molding machine comprising:

a stationary machine platen;

a movable machine platen which is movable toward and away from said stationary machine platen along a machine axis, to close and open a mold;

opposite support structure mounted to said movable platen;

a shuttle assembly mounted on said movable machine platen between said opposite support structure for movement with said movable machine platen, said shuttle assembly including a shuttle plate movable perpendicular to the machine axis and having a rear surface in close proximity to the movable machine platen;

at least one core pin retainer mounted on said shuttle plate for movement therewith, each said core pin retainer holding a core pin that receives a parison to be blown into a bottle;

slides movably mounted on said shuttle plate for movement with said shuttle plate and movable toward and away from each other in close proximity to a front surface of the shuttle plate around said at least one core pin retainer mounted on the shuttle plate, said slides having interchangeable neck rings;

an injection mold with interchangeable injection cavities mounted on said stationary platen;

at least one blow mold assembly with interchangeable blow mold halves defining blow mold cavities, said at least one blow mold assembly fixed relative to and positioned adjacent to said stationary machine platen; and at least one take off station mounted on the shuttle plate and including interchangeable pick off pins and stripper bushings movable along the pick off pins for removing a blown bottle on the pick off pins.

2. The machine of claim 1, wherein each take off station includes:

take off pins on which blown bottles are positioned;

stripper bushings formed around the take off pins; and at least one plate reciprocally movable along said take off pins to remove said bottles from said take off pins.

3. The machine of claim 1, further comprising two rails mounted on the stationary platen and wherein said at least one blow mold assembly is formed between said two rails.

4. The machine of claim 1, wherein each core pin retainer further includes an interchangeable neck ring adapter, and is formed with openings to bring temperature controlled liquids and gases to the core pin.

5. The machine of claim 4, further comprising at least one manifold formed on the shuttle plate, to bring said temperature controlled liquids and gases to the core pin retainers.

6. The machine of claim 1, wherein said opposite support structure for supporting said shuttle assembly, comprises:

two horizontally mounted and parallel guide rails secured to said movable platen;

bearing blocks movable on said guide rails;

vertical plates secured to said bearing blocks so as to be movable therewith along said guide rails, with said shuttle plate being secured to said vertical plates to reciprocally move the shuttle plate in a direction perpendicular to the machine axis.

7. The machine of claim 6, further comprising tie rods extending along said machine axis, and plates secured to said movable platen and formed around said tie rods for movement of said movable platen along said machine axis; and wherein the guide rails are secured to the plates that are secured to the movable platen, and the shuttle plate is positioned between the plates.

8. The machine of claim 6, further comprising cross bars which connect ends of the parallel guide rails to each other, to increase rigidity of the shuttle assembly.

9. The machine of claim 8, further comprising:

a structural angle connected with the guide rails, to provide additional rigidity; and adjustment bolts which connect the structural angle to the cross bars assembly to ensure a perfect alignment between components of the machine during machine closing.

10. The machine of claim 6, further comprising:

rails formed on a floor surface parallel to the machine axis;

adjustable extensions which connect parallel guide rails together;

bearing blocks mounted on lower ends of said adjustable extensions and ridable on the rails during a mold closing operation to prevent the machine from rocking during traverse of the shuttle plate.

11. The machine of claim 1, further comprising:

stationary plates precisely located relative to the stationary machine platen; and upper and lower parallel rails formed on the stationary plates; and wherein said at least one blow mold assembly is formed between said upper and lower parallel rails.

12. The machine of claim 11, further comprising tie rods extending along said machine axis; and wherein there are two pair of said stationary plates formed around said tie rods.

13. The machine of claim 11, wherein a number of vertical bars are formed between the upper and lower rails on both sides of the stationary platen, to increase the rigidity of the upper and lower rails which support the at least one blow mold assembly.

14. The machine of claim 11, further comprising precise spacers formed between said at least one blow mold assembly and the upper and lower rails to ensure a perfect vertical alignment between the slides and the at least one blow mold assembly.

15. The machine of claim 14, further comprising:

rods formed on the spacers;

a number of bearings formed at a bottom and top of the slides to ride on said rods, during opening and closing of the at least one blow mold assembly.

16. The machine of claim 13, wherein the vertical bars are formed with openings;

further comprising:

rods extending through the openings;

bearings mounted on a rear portion of the slides for riding on said rods, to prevent the at least one blow mold assembly from shifting in the direction of the machine axis.

17. The machine of claim 13, wherein a number of openings are formed in the vertical bars to retain blow mold plugs which form a bottom of a product blown from said parison.

18. The machine of claim 11, further comprising support beams for supporting the at least one blow mold assembly on a factory floor, the support beams including adjustable machine mounts formed between the lower rail and the factory floor.

19. The machine of claim 1, wherein said slides includes interchangeable blow cavities precisely located thereon which are aligned during blow mold closing.

20. The machine of claim 1, further comprising stationary plates mounted on the stationary platen, and wherein the injection mold with interchangeable injection cavities, is precisely located between the stationary plates.

21. The machine of claim 1, further comprising tubes formed above a front surface of the shuttle plate, to bring cooling fluids and compressed gases needed for temperature conditioning of the core pins, with minimum heat loss through the shuttle plate to surrounding machine and mold components.

22. The machine of claim 1, further comprising:

retainer blocks mounted on the shuttle plate; and retainer rods for retaining said slides on the shuttle plate, said retainer rods mounted for movement inside said retainer blocks.

23. The machine of claim 22, wherein said retainer blocks have bottom surfaces; and further comprising springs formed at the bottom surfaces of the retainer blocks, to lift the slides off the front surface of the shuttle plate, so as to prevent wear of the slides and damage to the neck rings during opening and closing of the slides.

24. The machine of claim 22, wherein there are at least two pair of the slides, with one slide of each pair moving in the same direction during opening and closing of the neck rings, and connected to each other through said retaining rods so as to move together, while the other slides of each pair move in an opposite direction and slide on said retaining rods.

25. The machine of claim 22, wherein said retainer rods are hollow and are provided with a number of openings to bring cooling fluids to those ones of the slides, to which the retaining rods are permanently connected.

26. The machine of claim 22, further comprising seals formed between said hollow rods and said slides attached to each other, to provide sealing of cooling fluids.

27. The machine of claim 22, further comprising bushings formed inside each slide to ensure smooth movement with minimum friction of the retainer rods inside the slides and to provide an alignment between said slides.

28. The machine of claim 22, further comprising bushings formed in said retainer blocks so that the retainer rods can move with minimum friction inside the retainer blocks during opening and closing of the slides.

29. The machine of claim 1,
wherein:
two said blow mold halves are movable toward and away from each other, each blow mold half having a first half cavity which together form a blow mold cavity when said two blow mold halves are moved toward each other into abutment, said blow mold cavity being open at opposite axial ends thereof, and each blow mold half having a second half cavity which together form a plug cavity when said blow mold halves are moved toward each other into abutment;

one said core pin having a parison thereon is insertable into one axial opening of said blow mold cavity; and further comprising:
a blow mold plug mounted within and along a center line of said blow mold cavity and within said plug cavity; and a blow plug insert axially movable into the other axial opening of said blow mold cavity to provide guidance during stretching of the parison in the axial direction.

30. The machine of claim 29, wherein the blow plug insert includes a first cylindrical portion of a first diameter axially movable into the other axial opening of said blow mold cavity, and a second cylindrical portion of a second, lesser diameter and connected with said first cylindrical portion, axially movable within said blow mold plug, said second cylindrical portion forwardly expandable by pressure applied to a bottom of the small cylindrical portion to contact the parison, and retractable under high pressure applied to the large cylindrical portion, after high pressure is introduced inside the parison, stretching the parison, while axially guiding the parison.

\* \* \* \* \*